UNITED STATES PATENT OFFICE.

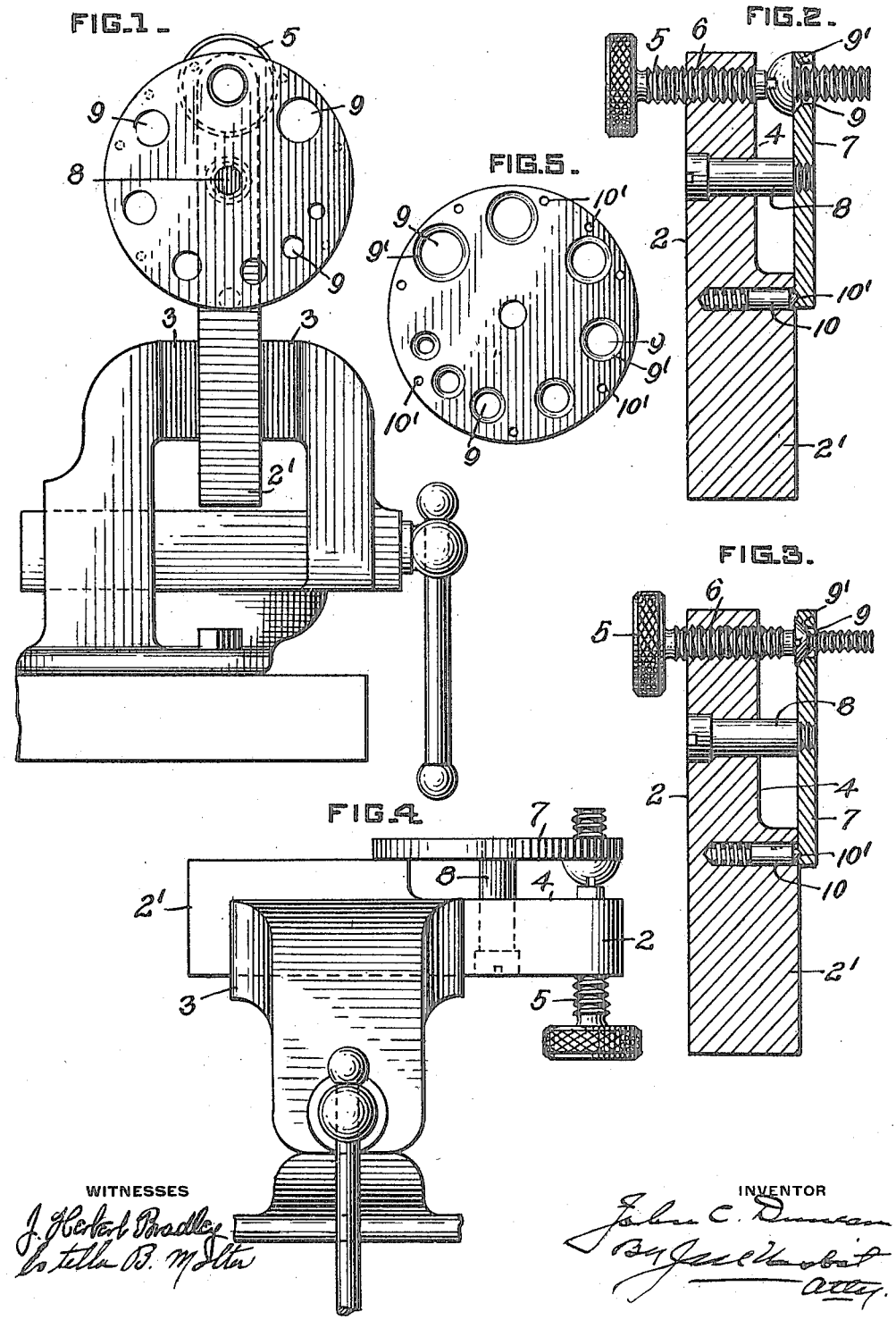

JOHN C. DUNCAN, OF PITTSBURGH, PENNSYLVANIA.

SCREW AND RIVET HOLDER.

1,208,522.  Specification of Letters Patent.  Patented Dec. 12, 1916.

Application filed April 24, 1916. Serial No. 93,091.

*To all whom it may concern:*

Be it known that I, JOHN C. DUNCAN, a citizen of the United States, and resident of Pittsburgh, in the county of Allegheny and State of Pennsylvania, have invented certain new and useful Improvements in Screw and Rivet Holders, of which the following is a specification.

Tool makers and other artisans experience much inconvenience in holding screws and rivets when they are to be shortened, filed or otherwise manipulated. The usual practice is to clamp the head portion of the screw or rivet in a vise with the body projecting therefrom and accessible for the required manipulation. But owing to the circular form of the screw head and the comparatively small surface engagement of the vise jaws, the hold is insecure, and more often than not the screw shifts or turns while the work is in progress. A further objection to this usual practice is that the screw and rivet heads are frequently distorted by the clamping pressure of the vise.

The object of the present invention is to provide simple and efficient means for rigidly holding a screw or rivet without marring the same, and with the body thereof accessible for sawing, filing or other manipulation.

In the accompanying drawings, Figure 1 is an elevation of the improved appliance shown in an upright position in a vise for sawing off or shortening the screw body. Figs. 2 and 3 are sectional elevations of the appliance taken at right angles to Fig. 1, Fig. 2 illustrating the same as holding a round head screw and Fig. 3 a screw having a flat and beveled head. Fig. 4 is an illustration of the appliance turned in the vise to horizontal position for the purpose of filing the extremity of the shortened screw. Fig. 5 is a rear elevation of the plate-like holder element.

Referring to the drawings, 2 designates a support-forming arm having a projecting shank portion 2' which is adapted to be clamped between jaws 3 of a vise. Arm 2 is reduced in width for a distance inwardly from its outer end as indicated at 4, and carried by the outer end of the arm is the screw securing device, here shown in the form of a headed clamping screw 5 which is adjustable through the threaded passage 6 in the arm.

The screw or rivet holding element is apertured to pass the screw or rivet body, with the head thereof bearing against the face of the holder, and the latter is movably mounted on the supporting arm for placing the screw or rivet in line with clamping screw 5. In the embodiment here shown, the holder element consists of a circular flat plate 7 which is spaced from the narrowed portion 4 of arm 2, being mounted on the extremity of projecting spindle 8 revoluble in arm 2. Plate 7 is formed with a series of apertures 9 arranged concentrically with reference to spindle 8, whereby upon turning plate 7 one or another of the apertures may be placed in line with clamping screw 5. Apertures 9 are of different diameters to accommodate screw and rivets of different sizes, with the inner face of the screw or rivet head engaging the inner surface of plate 7 and adapted to be clamped thereagainst by screw 5, the body of the screw or rivet projecting through and beyond the front face of plate 7 where it is readily accessible for sawing, filing or other manipulation. For securely holding screws or rivets having flat heads beveled on their under faces, apertures 9 may be counter-sunk at 9' for positively seating such head, as shown in Fig. 3.

As the clamping pressure of screw 5 tends to cant or strain plate 7, provision is made for supporting the edge portion of the latter at a point diametrically opposite the clamping screw. In the present adaptation plate 7 is caused to overhang shank 2' of the supporting arm, and bear against the same when the clamping pressure is applied, whereby plate 7 is rigidly held and protected from injurious strain.

The overhanging portion of plate 7 is utilized in connection with a latch device for positioning one or another of apertures 9 in line with the clamping screw. As here shown a spring latch 10 is arranged in the cavity in shank 2' beneath plate 7, and is adapted to engage one or another of the detents 10' in the under face of the latter. And with a detent arranged diametrically opposite each aperture 9, plate 7 may be turned until the screw or rivet, inserted in the appropriate aperture 9, is in line with the clamping screw, when the latch enters the detent corresponding to that aperture and holds plate 7 against involuntary movement.

The appliance may of course be secured in any position in the vise that may be most convenient for the operator. For sawing off or shortening the screw or rivet, I find it most convenient to place the tool in the upright position shown in Fig. 1, and after that operation has been completed it may be turned to horizontal position shown in Fig. 4 with the shortened screw or rivet body extending upwardly conveniently for filing the cut extremity of the screw.

I claim:

1. The combination of a support, an apertured screw holder and a device for clamping a screw each movably mounted on the support, the movable holder adapted to place the supported screw either in or out of position to be clamped, the screw body extending through the holder aperture with the screw head bearing on the face of the holder disposed toward the clamp, the face of the holder distant from the clamp being accessible for operating on the screw body projecting therethrough.

2. In a work holder, the combination of a support, a holder movably mounted on the support and formed with a series of apertures, one face of the holder being accessible for operating on a screw body projecting through any one of the apertures and with the screw head bearing against the opposite face of the holder, and a clamping device adjustable in the support and with which any one of the holder apertures is adapted to be moved into alinement for clamping the headed end of the screw.

3. In a work holder, the combination of a supporting arm, a clamp device for a screw mounted thereon, an apertured holder rotatably mounted on the arm and adapted to resist pressure in direction away from the arm, the face of the holder adjacent the clamp adapted to receive a screw head in line with the clamp and the opposite face thereof accessible for operating on the screw body projecting through the holder aperture.

4. The combination of a support, a screw holder rotatably mounted thereon and formed with a concentric series of apertures, and a clamp device mounted on the support and with which each of the holder apertures is adapted to be alined for clamping a headed screw, the screw body projecting from the face of the holder distant from the clamp device and with said distant face and the projecting screw accessible for operating on the latter.

5. The combination of a support, a plate-like holder rotatably mounted on the support and having a screw receiving aperture, a clamp adjustable in the support for engaging a headed screw entered in said aperture and thereby adapted to exert pressure on the rotatable holder in direction away from the support, the support having a bearing surface for that portion of the rotatable holder located diametrically opposite the portion subjected to pressure for preventing the holder from tilting when under pressure, the screw body projecting from the face of the holder distant from the clamp and accessible for the purpose described.

6. The combination of an arm adapted to be secured in a vise, the arm being of reduced width for a portion of its length, a plate-like holder rotatably mounted on and spaced from the portion of the arm of reduced width and adapted at one side of its center to bear on the portion of the arm of unreduced width, the plate having an aperture adapted to pass the body of a headed screw with the screw head bearing on the face of the plate disposed toward the part of the arm of reduced width, and a clamp device adjustable in the reduced portion of the arm for engaging the head of the supported screw for confining the latter with the portion of the screw projecting from the distant face of the holder accessible for the purpose described.

7. The combination of an arm adapted to be secured in a vise, an apertured plate-like holder rotatably mounted on the arm and adapted at one side of its center to bear on the arm, a spring latch mounted in the portion of the arm on which the plate bears and the plate having spaced holding points adapted to be engaged by the latch, a clamp device adjustably positioned in the arm, the plate-like holder apertured to pass the body of a headed screw with the screw head adapted to be engaged by the clamp device and with the screw body projecting through the holder and accessible at the face of the latter distant from the clamp device for the purpose described.

In testimony whereof, I affix my signature in presence of two witnesses.

JOHN C. DUNCAN.

In presence of—
 J. M. NESBIT,
 ALEX. S. MABON.

Copies of this patent may be obtained for five cents each, by addressing the "Commissioner of Patents, Washington, D. C."